United States Patent
Huang

(10) Patent No.: US 12,556,615 B2
(45) Date of Patent: Feb. 17, 2026

(54) CLOUD PLATFORM DOCKING DEBUGGING METHOD AND APPARATUS, ELECTRONIC DEVICE AND STORAGE MEDIUM

(71) Applicant: ZHEJIANG UNIVIEW TECHNOLOGIES CO., LTD., Zhejiang (CN)

(72) Inventor: Cheng Huang, Zhejiang (CN)

(73) Assignee: ZHEJIANG UNIVIEW TECHNOLOGIES CO., LTD., Zhejiang (CN)

( * ) Notice: Subject to any disclaimer, the term of this patent is extended or adjusted under 35 U.S.C. 154(b) by 99 days.

(21) Appl. No.: 18/292,269

(22) PCT Filed: Jul. 21, 2022

(86) PCT No.: PCT/CN2022/106923
§ 371 (c)(1),
(2) Date: Jan. 25, 2024

(87) PCT Pub. No.: WO2023/016221
PCT Pub. Date: Feb. 16, 2023

(65) Prior Publication Data
US 2024/0275855 A1  Aug. 15, 2024

(30) Foreign Application Priority Data
Aug. 11, 2021  (CN) .......................... 202110919998.5

(51) Int. Cl.
*G06F 15/16* (2006.01)
*G06F 11/362* (2025.01)
*H04L 67/00* (2022.01)

(52) U.S. Cl.
CPC ............ *H04L 67/34* (2013.01); *G06F 11/362* (2013.01)

(58) Field of Classification Search
None
See application file for complete search history.

(56) References Cited

U.S. PATENT DOCUMENTS

| | | |
|---|---|---|
| 10,725,890 B1 | 7/2020 | Goyal et al. |
| 2012/0218690 A1 | 8/2012 | Okutsu |

(Continued)

FOREIGN PATENT DOCUMENTS

| | | |
|---|---|---|
| CN | 106533984 A | 3/2017 |
| CN | 108509333 A | 9/2018 |

(Continued)

OTHER PUBLICATIONS

Chinese Office Action in Application No. 202110919998.5, dated Feb. 2, 2024, 15 pages including translation.

(Continued)

*Primary Examiner* — Phuoc H Nguyen
(74) *Attorney, Agent, or Firm* — MASCHOFF BRENNAN

(57) ABSTRACT

Provided are a cloud platform docking debugging method and apparatus, an electronic device, and a storage medium. The cloud platform docking debugging method includes steps below. According to debugging application information of a to-be-debugged application, a target Internet of Things device is determined from multiple candidate Internet of Things devices provided externally by the cloud platform, and the target Internet of Things device is allocated to the to-be-debugged application. Docking and debugging between the target Internet of Things device allocated to the to-be-debugged application and the to-be-debugged application on a development end side are controlled. The candidate Internet of Things device includes an Internet of (Continued)

Things device that is pre-built and accessed through the cloud platform and provides externally, as a public resource, a debugging service.

18 Claims, 4 Drawing Sheets

(56)  References Cited

U.S. PATENT DOCUMENTS

| | | | |
|---|---|---|---|
| 2014/0173565 | A1 | 6/2014 | Scholl et al. |
| 2017/0277521 | A1* | 9/2017 | Sharma ..................... G06F 8/35 |
| 2019/0361792 | A1* | 11/2019 | Goldberg ............ G06F 11/3632 |
| 2020/0076680 | A1* | 3/2020 | Pruitt ...................... H04L 41/20 |
| 2021/0224084 | A1* | 7/2021 | Molchanov ............. G06F 9/451 |
| 2021/0360083 | A1* | 11/2021 | Duggal ................... H04L 67/34 |

FOREIGN PATENT DOCUMENTS

| | | | |
|---|---|---|---|
| CN | 110471845 | A | 11/2019 |
| CN | 110750312 | A | 2/2020 |
| CN | 110750359 | A | 2/2020 |
| CN | 112799970 | A | 5/2021 |
| CN | 113612850 | A | 11/2021 |

OTHER PUBLICATIONS

International Search Report in Application No. PCT/CN2022/106923, dated Oct. 24, 2022, 4 pages, including translation.
Extended European Search Report for Application No. 22855204.8, dated Jun. 27, 2025, 10 pages.

* cited by examiner

CLOUD PLATFORM DOCKING DEBUGGING METHOD AND APPARATUS, ELECTRONIC DEVICE AND STORAGE MEDIUM

CROSS REFERENCE TO RELATED APPLICATIONS

This is a national stage application filed under 37 U.S.C. 371 based on International Patent Application No. PCT/CN2022/106923, filed Jul. 21, 2022, which claims priority to Chinese Patent Application No. 202110919998.5 filed with the China National Intellectual Property Administration (CNIPA) on Aug. 11, 2021, the disclosures of which are incorporated herein by reference in their entireties.

TECHNICAL FIELD

Embodiments of the present application relate to the field of testing technology, for example, a cloud platform docking debugging method and apparatus, an electronic device, and a storage medium.

BACKGROUND

For manufacturers who provide devices and middle-platform services, establishing a cloud platform, opening up the access capabilities of the cloud platform, attracting partners to quickly complete docking and debugging, and rapidly developing an ecosystem that is advantageous to them have become the key to long-term development of an enterprise. The convenience of docking and debugging with partners directly affects whether an enterprise can quickly build a domain ecosystem in a short period of time. A common docking and debugging solution is as follows: A partner acquires a docking device from special channels, builds a public network environment, and adds the docking device to a cloud account system specified by the enterprise so that debugging can be performed. However, the above solution causes problems such as inconvenient debugging and low problem-solving efficiency, making it impossible to effectively dock and debug application services.

SUMMARY

Embodiments of the present application provide a cloud platform docking debugging method and apparatus, an electronic device, and a storage medium to avoid the dispersion of partner developers and inconvenient debugging and improve the efficiency of problem solving.

Embodiments of the present application provide a cloud platform docking debugging method. The method is applied to a cloud platform and includes steps below.

According to debugging application information of a to-be-debugged application, a target Internet of Things device is determined from multiple candidate Internet of Things devices provided externally by the cloud platform, and the target Internet of Things device is allocated to the to-be-debugged application.

Docking and debugging between the target Internet of Things device allocated to the to-be-debugged application and the to-be-debugged application on a development end side are controlled.

The multiple candidate Internet of Things devices include an Internet of Things device that is pre-built and accessed through the cloud platform and provides externally, as a public resource, a debugging service.

Embodiments of the present application also provide a cloud platform docking debugging apparatus. The apparatus is applied to a cloud platform and includes a device determination module and a control allocation module.

The device determination module is configured to determine, according to debugging application information of a to-be-debugged application, a target Internet of Things device from multiple candidate Internet of Things devices provided externally by the cloud platform and allocate the target Internet of Things device to the to-be-debugged application.

The control allocation module is configured to control docking and debugging between the target Internet of Things device allocated to the to-be-debugged application and the to-be-debugged application on a development end side.

The multiple candidate Internet of Things devices include an Internet of Things device that is pre-built and accessed through the cloud platform and provides externally, as a public resource, a debugging service.

Embodiments of the present application also provide an electronic device.

The device includes one or more processors and a storage apparatus.

The storage apparatus is configured to store one or more programs.

The one or more programs, when executed by the one or more processors, cause the one or more processors to perform the cloud platform docking debugging method according to any embodiment of the present application.

Embodiments of the present application also provide a computer-readable storage medium. The computer-readable storage medium stores a computer program which, when executed by a processor, performs the cloud platform docking debugging method according to any embodiment of the present application.

BRIEF DESCRIPTION OF DRAWINGS

The same reference numerals throughout the drawings indicate the same components. In the drawings.

DETAILED DESCRIPTION

Figure 1:
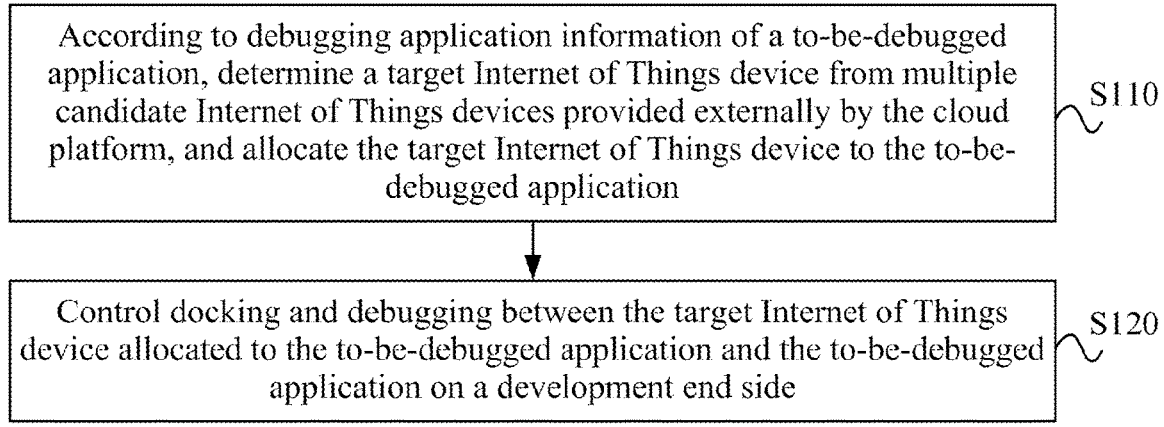
FIG. 1 is a flowchart of a cloud platform docking debugging method according to an embodiment of the present application.

The present application is further described in detail in conjunction with drawings and embodiments. It is to be understood that the embodiments set forth below are intended to illustrate and not to limit the present application. Additionally, it is to be noted that for ease of description, only part, not all, of structures related to the present application is illustrated in the drawings.

Before exemplary embodiments are discussed in more detail, it is to be noted that some of the exemplary embodiments are described as processes or methods depicted in flowcharts. Although the flowcharts describe multiple operations (steps) as sequential processes, many of the operations (steps) may be implemented concurrently, coincidently, or simultaneously. Additionally, the sequence of the multiple operations may be rearranged. Each of the processes may be terminated when the operations are completed but may also have additional steps not included in the drawings. Each of the processes may correspond to one of a method, a function, a procedure, a subroutine, a subprogram, etc.

FIG. 1 is a flowchart of a cloud platform docking debugging method according to an embodiment of the present application. This embodiment of the present application may be applied to the docking and debugging of a cloud platform. The cloud platform docking debugging method may be executed by a cloud platform docking debugging apparatus. The cloud platform docking debugging apparatus may be implemented by software and/or hardware and may be integrated into any electronic device having a network communication function. As shown in FIG. 1, the cloud platform docking debugging method provided in the embodiment of the present application includes the steps below.

In S110, according to debugging application information of a to-be-debugged application, a target Internet of Things device is determined from multiple candidate Internet of Things devices provided externally by the cloud platform, and the target Internet of Things device is allocated to the to-be-debugged application.

The debugging may refer to the necessary procedures to ensure that a provided device can operate normally. For example, it is necessary to conduct docking and debugging with a prototype before a device is purchased to ensure the normal operation of the device. For example, the to-be-debugged application includes but is not limited to software-as-a-service (SaaS) applications such as apps, clients, and applets developed for groups in specific fields.

A candidate Internet of Things device may refer to an Internet of Things device that is pre-built and accessed through the cloud platform and provides externally, as a public resource, a debugging service. For example, an Internet of Things monitoring device is connected to a cloud service platform through a router in a local area network, a public device resource is provided through the cloud service platform, and the Internet of Things monitoring device is added to an account. For example, the candidate Internet of Things device includes but is not limited to an Internet of Things monitoring device such as an ordinary IP Camera (IPC), a license plate recognition network camera, a network video recorder (NVR), and an access control device (the access control device is equipped with a camera).

After a user registers an account on an Internet of Things cloud service platform, multiple Internet of Things monitoring devices are connected to the cloud service platform through a router in a local area network, and the multiple Internet of Things monitoring devices are added to the account. After logging into the cloud service platform account through a client application, the user may view the Internet of Things monitoring device under the user's account and perform service operations.

In S120, docking and debugging between the target Internet of Things device allocated to the to-be-debugged application and the to-be-debugged application on a development end side are controlled.

The candidate Internet of Things device includes an Internet of Things device that is pre-built and accessed through the cloud platform and provides externally, as a public resource, a debugging service.

Figure 2:
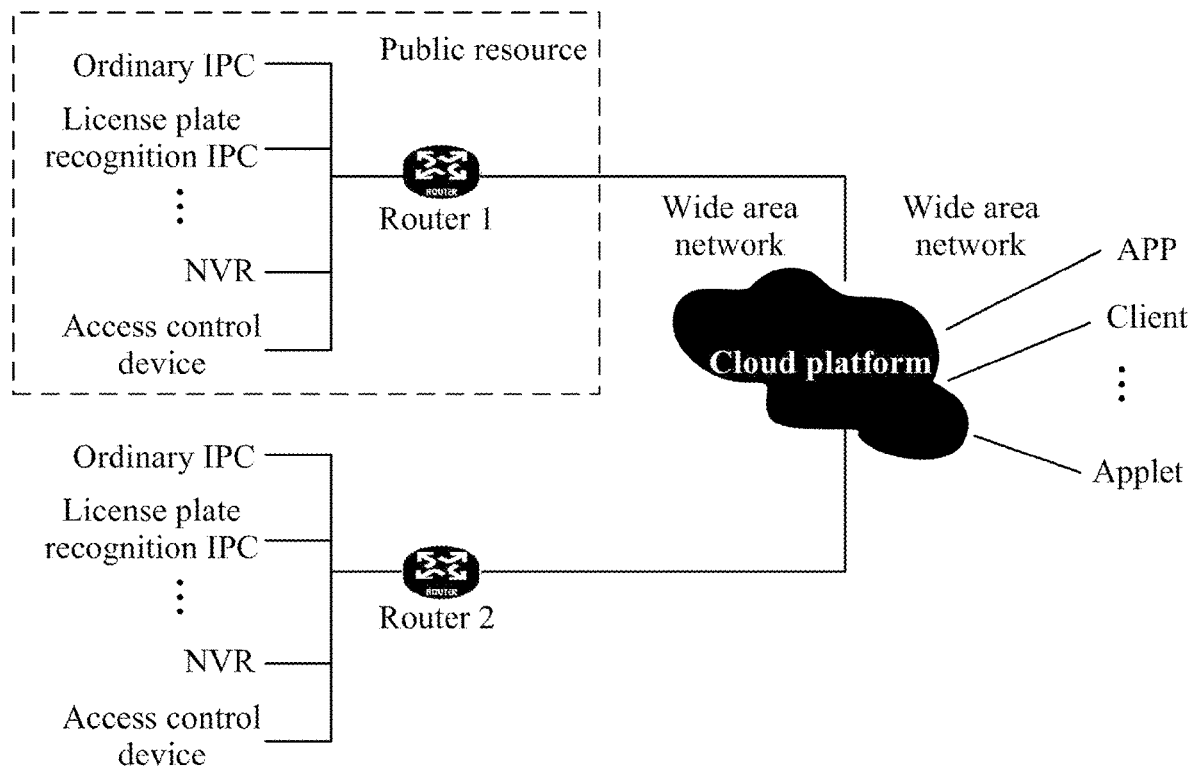
FIG. 2 is a diagram illustrating the deployment of a networking mode of a wide area network environment device according to an embodiment of the present application.

With reference to FIG. 2, a networking mode of a wide area network environment device is described. For example, a SaaS application developed by a partner interacts with the cloud platform by calling the application programming interface (API) through the wide area network and interacts with the Internet of Things device under the account through the cloud platform account. After parsing an API request message of the SaaS application, the cloud platform, serving as a central server, delivers the instruction to the Internet of Things device to implement a service operation.

Partner developers may build a debugging environment by themselves. For example, if a partner develops an APP, after acquiring Internet of Things devices, the partner connects the Internet of Things devices to the cloud platform in the wide area network through Router 2, and then these Internet of Things devices are able to be accessed. When many partners exist, the secondment and allocation of Internet of Things devices not only takes a long time but also has low resource utilization. To avoid inconvenient debugging for partners, in the method provided by the present application, a cloud platform provider builds a public resource environment and connects it to the wide area network cloud platform for partners to perform debugging and docking, as described in the dotted line box in FIG. 2. Partner developers debug through the resources provided by the cloud platform provider.

The embodiment of the present application provides a cloud platform docking debugging method. According to the debugging application information of the to-be-debugged application, the target Internet of Things device is determined from multiple candidate Internet of Things devices provided externally by the cloud platform, and the target Internet of Things device is allocated to the to-be-debugged application. Docking and debugging between the target Internet of Things device allocated to the to-be-debugged application and the to-be-debugged application on a development end side are controlled. In this embodiment, a unified public docking environment resource is pre-built so that developers do not need to separately deploy and transport devices or build a public network environment during debugging. Developers can directly use the public resources provided by the cloud platform to achieve normal debugging, avoiding the dispersion of partner developers and inconvenient debugging and improving the efficiency of problem solving.

Figure 3:
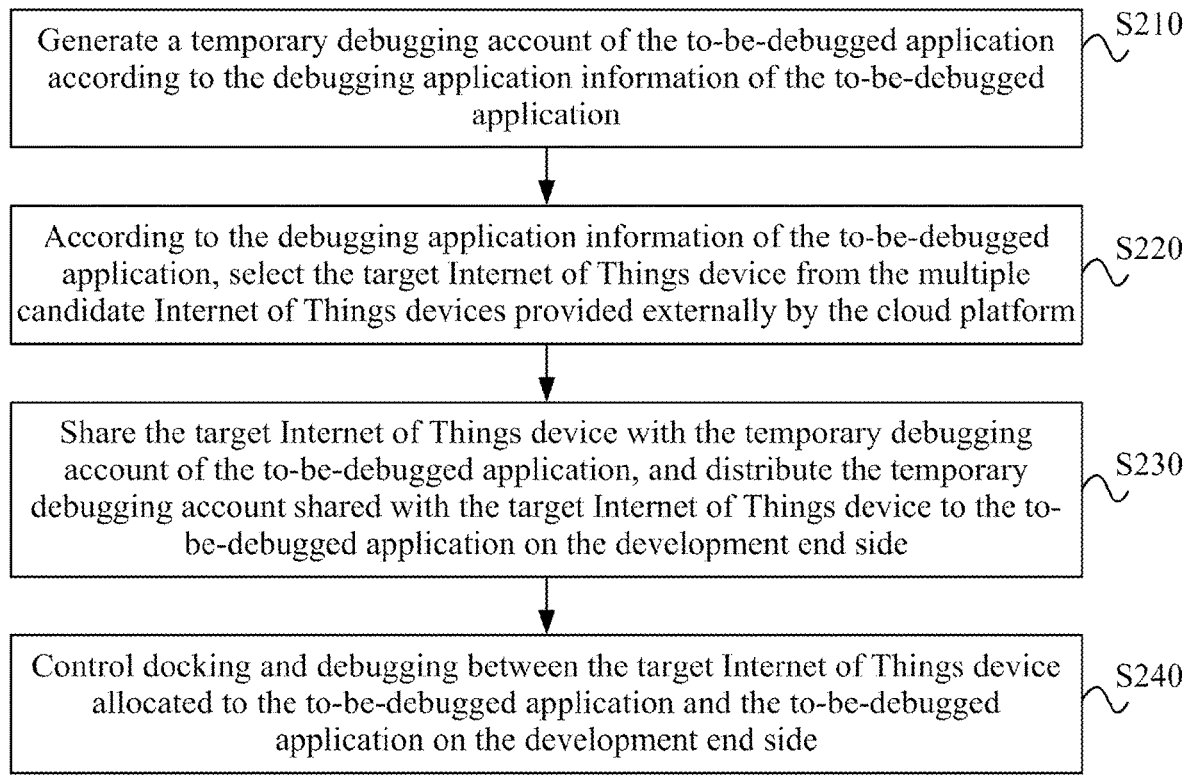
FIG. 3 is a flowchart of a cloud platform docking debugging method according to another embodiment of the present application.

FIG. 3 is a flowchart of a cloud platform docking debugging method according to another embodiment of the present application. This embodiment of the present application further refines the preceding embodiments based on the preceding embodiments and may be combined with each example solution in the preceding one or more embodiments. As shown in FIG. 3, the cloud platform docking debugging method provided in this embodiment of the present application may include the steps below.

In S210, a temporary debugging account of the to-be-debugged application is generated according to the debugging application information of the to-be-debugged application.

The cloud platform binds public resource environment devices to a resource management account. After acquiring the debugging application information of a partner developer, the system automatically generates a temporary debugging account (for example, valid for 48 hours). The debugging application information includes but is not limited to service debugging content, a service debugging sequence, a service debugging validity period, and a device model that needs to be purchased for service debugging.

In S220, according to the debugging application information of the to-be-debugged application, the target Internet of Things device is selected from the multiple candidate Internet of Things devices provided externally by the cloud platform.

The candidate Internet of Things device includes an Internet of Things device that is pre-built and accessed through the cloud platform and provides externally, as a public resource, a debugging service.

In an example solution of this embodiment, selecting, according to the debugging application information of the to-be-debugged application, the target Internet of Things device from the multiple candidate Internet of Things devices provided externally by the cloud platform includes operations below.

According to the service debugging content included in the debugging application information, the same candidate Internet of Things device that matches the service debugging content is selected from preset device resource pools of at least two categories as the target Internet of Things device.

Alternatively, according to the service debugging content and the service debugging sequence included in the debugging application information, different candidate Internet of Things devices are sequentially selected from preset device resource pools of at least two categories to combine as target Internet of Things devices, and it is ensured that a combined target Internet of Things device group matches the service debugging content. For example, when fully matched to-be-debugged resources exist, the same candidate Internet of Things device that matches the service debugging content is selected from the preset device resource pools of the at least two categories as the target Internet of Things device according to the service debugging content included in the debugging application information. Each candidate Internet of Things device has a preset device resource pool to which the each candidate Internet of Things device belongs, and in the preset device resource pools of different categories, some preset device resource pools are configured with the same candidate Internet of Things device.

For example, the preset device resource pools of the at least two categories include an information acquisition type of resource pool, a short-term operation type of resource pool, and a special operation type of resource pool; a candidate Internet of Things device in the information acquisition type of resource pool is allowed to be shared with different debugging accounts at the same time, and a candidate Internet of Things device in the short-term operation type of resource pool or the special operation type of resource pool is only allowed to be shared with one debugging account at the same time.

For example, when matching is performed through debugging content, but the debugging matching is unsuccessful, different candidate Internet of Things devices are sequentially selected from the preset device resource pools of the at least two categories to combine as target Internet of Things devices according to the service debugging content and the service debugging sequence included in the debugging application information, and it is ensured that the combined target Internet of Things device group matches the service debugging content. Preset device resource pools of different categories are obtained by the division of multiple candidate Internet of Things device resources according to a service debugging category, operability on a device and impact on the device.

Figure 4:
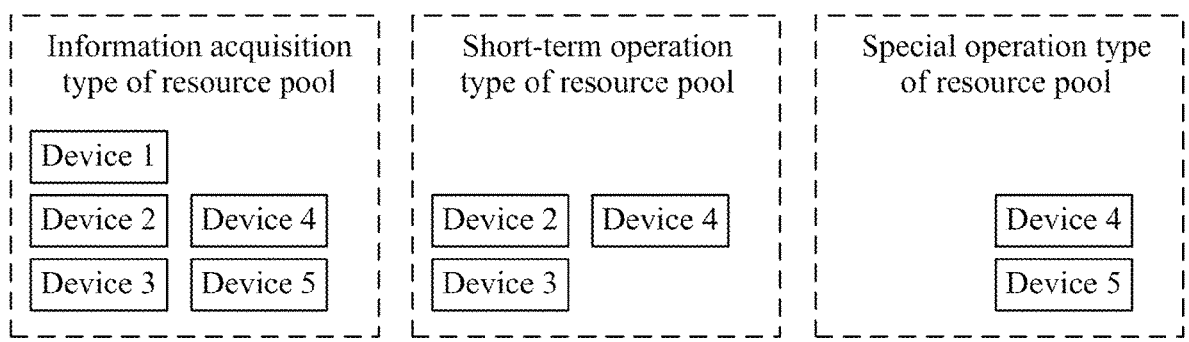
FIG. 4 is a block diagram illustrating the structure of a device resource classification according to an embodiment of the present application.

With reference to FIG. 4, the cloud platform provides external functional debugging content and performs classification according to the operability and impact on a device; the debugging categories include but are not limited to an information acquisition type, a short-term operation type, and a special operation type. According to the service classification, many different categories may be divided. The present application lists the following three categories for explanation: The information acquisition type of operation, the short-term operation type and the short-term operation type. The information acquisition type of operation includes but is not limited to live and playback operations. The related signaling delivery only acquires information from a device and does not affect other operations. The short-term operation type includes but is not limited to Pan-Tilt-Zoom (PTZ) operations and has an immediate and short-term impact on a device. The special operation type includes but is not limited to the delivery of license plate lists and facial databases and has a long-term impact on the changes in the internal data and parameters of a device.

To improve resource utilization and reduce mutual interference between developers, the present application provides a resource allocation model and a resource allocation strategy. According to the debugging category and device capabilities, device resources are divided into three resource pools, that is, an information acquisition type of resource pool, a short-term operation type of resource pool, and a special operation type of resource pool.

According to the debugging content in the information requested by a developer, a device is selected from the resource pools for sharing by using a minimum resource combination method. The basic principle of the resource allocation model is as follows: Providing a single resource that fully matches the debugging content, which consumes the least device resources. When the system does not have a single resource, the system provides a combination from the resource library through a debugging sequence.

A device of the information acquisition type of resource pool may be shared with different debugging accounts at the same time. A device that is only in the information acquisition type of resource pool is allocated first. For example, when both developer A and developer B have a live function debugging requirement, device 1 is shared with the debugging accounts of developer A and B at the same time.

A device of the short-term operation type of resource pool or special operation type of resource pool may only be used by one debugging account at a time.

Resource allocation management and scheduling allocation are performed according to the user application sequence and debugging content sequence.

In S230, the target Internet of Things device is shared with the temporary debugging account of the to-be-debugged application, and the temporary debugging account shared with the target Internet of Things device is distributed to the to-be-debugged application on the development end side.

Resource allocation management and scheduling allocation are performed according to the user application sequence and debugging content sequence. For example, with reference to FIG. 4, it is assumed that the content debugged by the developer is in the modules below, for example, a live operation, a PTZ operation, and a face comparison operation. The live operation, the PTZ operation, and the face comparison operation correspond to the information acquisition type of content, short-term operation type of content, and special operation type of content, respectively.

When the debugging content of a developer is only a live operation, a device is only acquired from the device resource pool that only supports information acquisition type of capabilities, with device 1 being the priority, followed by other devices. When the debugging content of the developer is a live operation and a PTZ operation, a device that supports the live and PTZ functions is selected from the short-term operation type of resource pool, with device 2 or device 3 being allocated first, followed by device 4. When the debugging content of the developer is a live operation and a face comparison operation, a device that supports both the live operation and the face comparison operation is selected from the special operation type of resource pool, with device 5 being allocated.

When the system does not have a single resource, allocable devices are randomly selected from each resource pool in combination with the debugging sequence, and the allocable devices are assigned a trial period and presented to the user. The user debugs within the specified time, and the allocable devices are automatically recycled upon expiration. The user may apply for trial again as required.

Device 4 is preferred when the debugging content of the developer is a live operation, a PTZ operation, and a face comparison operation. If device 4 is already occupied at this time, and the system does not have a single device resource that can support the three operations at the same time, device resources are acquired from the three resource pools according to the usage of devices and allocated a certain debugging period. The device resources are automatically shared and unshared within the allocated period.

For example, it is assumed that the sequence of debugging by the developer is sequentially a live operation, a PTZ operation, and a face comparison operation, and device 1, device 3, and device 5 are selected from the resource pools. Device 3 and device 5 are separately allocated a trial time period, sharing is performed when the corresponding time period begins, and when the corresponding time period ends, sharing of the devices is canceled, and the device resources are recycled.

When it appears in the system that no available resources exist to meet debugging requirements within a certain period of time, a system reminder is sent to the operation and maintenance personnel to add corresponding device resources.

In S240, docking and debugging between the target Internet of Things device allocated to the to-be-debugged application and the to-be-debugged application on the development end side are controlled.

The embodiment of the present application provides a cloud platform docking debugging method. A temporary debugging account of the to-be-debugged application is generated according to the debugging application information of the to-be-debugged application. According to the debugging application information of the to-be-debugged application, the target Internet of Things device is selected from the multiple candidate Internet of Things devices provided externally by the cloud platform. The target Internet of Things device is shared with the temporary debugging account of the to-be-debugged application, and the temporary debugging account shared with the target Internet of Things device is distributed to the to-be-debugged application on the development end side. Docking and debugging between the target Internet of Things device allocated to the to-be-debugged application and the to-be-debugged application on a development end side are controlled. In this embodiment, resources are properly allocated according to the actual service of users through a resource allocation model, which improves debugging resource utilization, avoids usage conflicts of users, and improves user experience.

Figure 5:
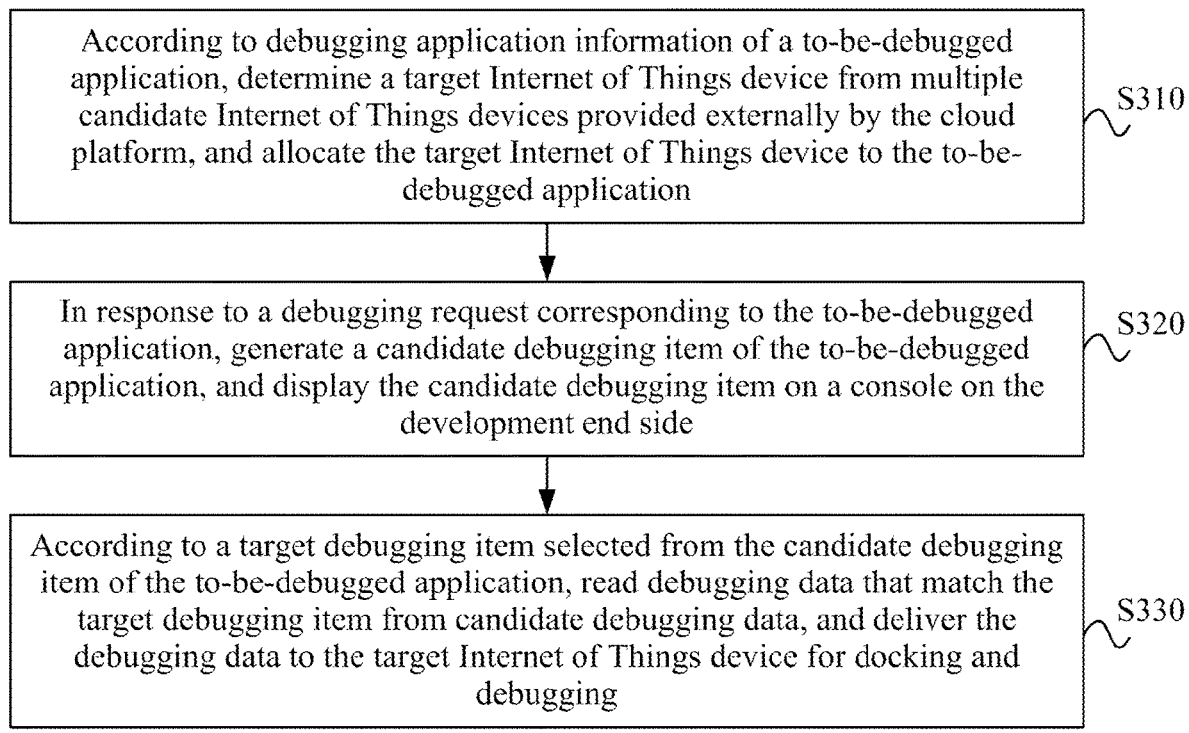
FIG. 5 is a flowchart of a cloud platform docking debugging method according to another embodiment of the present application.

FIG. 5 is a flowchart of a cloud platform docking debugging method according to another embodiment of the present application. This embodiment of the present application further refines the preceding embodiments based on the preceding embodiments and may be combined with each example solution in the preceding one or more embodiments. As shown in FIG. 5, the cloud platform docking debugging method provided in this embodiment of the present application may include the steps below.

In S310, according to debugging application information of a to-be-debugged application, a target Internet of Things device is determined from multiple candidate Internet of Things devices provided externally by the cloud platform, and the target Internet of Things device is allocated to the to-be-debugged application.

In S320, in response to a debugging request corresponding to the to-be-debugged application, a candidate debugging item of the to-be-debugged application is generated, and the candidate debugging item is displayed on a console on the development end side.

For example, generating the candidate debugging item of the to-be-debugged application includes acquiring the candidate debugging data selected and imported by the console on the development end side or acquiring the candidate debugging data from standard test databases of different service types pre-built on the cloud platform.

According to the service debugging content carried in the debugging request, candidate debugging data that match the service debugging content are selected to generate the candidate debugging item.

The candidate debugging data include but are not limited to standard test data of different service types pre-built on the cloud platform and user-defined test data imported to the cloud platform through the console on the development end side.

In S330, according to a target debugging item selected from the candidate debugging item of the to-be-debugged application, debugging data that match the target debugging item are read from candidate debugging data, and the debugging data are delivered to the target Internet of Things device for docking and debugging.

Developers fail to construct comprehensive and effective data and conditions for debugging due to their different levels of understanding of the video surveillance field or their limited conditions, resulting in poor quality of SaaS applications of partners. Some problems of quality may even be exposed in practical use, which affects user experience and service promotion. For example, for a message reporting function of license plate recognition, it is often necessary to deploy a camera in the actual road scene during actual testing, or a camera shoots against a previously recorded road scenario video. On one hand, a developer does not necessarily have the corresponding condition. On the other hand, different scenario contents may not cover all test items, causing the SaaS application of partners to omit the handling of key exceptions and to expose quality problems in practical use.

Additionally, in a usage scenario of an Internet of Things device, a large number of service triggers depend on stringent conditions. For example, if a developer accesses a license plate recognition function, the developer needs to rely on passing vehicle data appearing in the camera to acquire reported messages from the cloud platform. Although conditions may be constructed by pointing the camera at the recorded video, a personal computer (PC) needs to be configured in the environment for a long time, which increases resource consumption. After the face library is configured for an access control device, a corresponding person needs to appear in an access control photographing scenario to implement the service normally, which brings a lot of inconvenience to environment debugging.

To this end, this embodiment provides a customized testing method, which can reduce the difficulty of building an environment and improve the quality of partner applications through the improvement of a unified testing environment and data.

In an example, test template databases of different service types are built in the cloud platform, and data types include but are not limited to pictures, videos, and messages. When a developer tests the corresponding functions, the cloud platform selects the corresponding service data from the test template databases and sends the corresponding service data to the device allocated to the developer's test account. After the device receives the data delivered by the cloud platform, the service layer of the device parses the data and reports the data.

Figure 6:
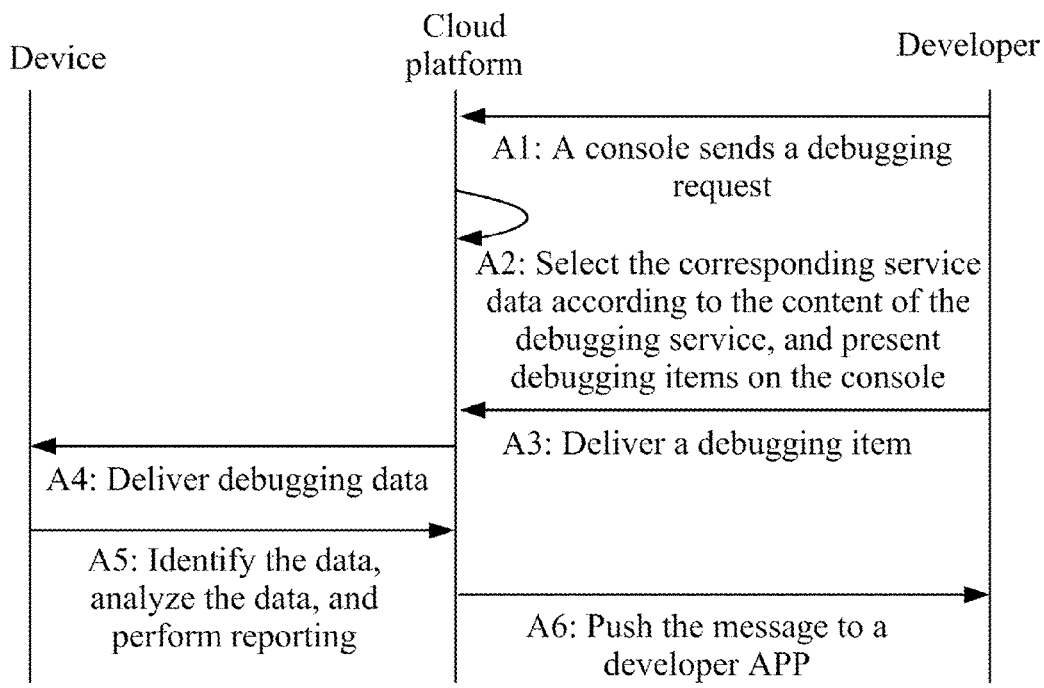
FIG. 6 is a flowchart of a platform-defined standard library test according to an embodiment of the present application.

In addition to a service processing module, the constructed cloud platform system may also include a console presented to a developer and a database storing test templates. The console may present information such as account information and debugging content to a developer in the form of a web page or another client. The flow is shown in FIG. 6.

In A1, a developer sends a debugging request through a console; the debugging request includes the content of the debugging service.

In A2, after receiving the debugging request, the cloud platform service processing module selects the test template data of the corresponding service according to the content of the debugging service and presents all debugging items on the console. For example, it is assumed that the service debugged by the developer is license plate recognition, and the test template data contain 20 debugging items; then the 20 detailed debugging items are presented on the console.

In A3, the developer operates on the console and delivers a specified debugging item.

In A4, after receiving the debugging item delivered by the developer, the cloud platform reads the corresponding data from the test template database and delivers the corresponding data to a device specified in the developer's debugging account.

In A5, after the device acquires the data delivered by the cloud platform, the device's service processing module identifies the data, analyzes the data through built-in algorithm, and reports the identification result to the cloud platform.

In A6, after receiving the identification result reported by the device, the cloud platform pushes the message to a developer APP.

In this method, the test template data may be pre-defined and continuously updated. The application conditions considered may be more abundant, and the test may be more sufficient. Compared with a device acquiring data through the lens, the cloud platform delivers data, which is just another data source. The processing logic of the device's service processing module does not change, and too much additional development cost is not added.

In the networking, a developer APP directly interacts with the cloud platform and is not directly connected to the device. During debugging, more attention is paid to the path between the APP and the cloud platform. In practical use, the device is also a key link in the complete networking. The whole debugging process still remains through the device to identify the data and report the data, so that the debugging path is closer to the practical application path, rather than through the cloud platform to simulate the data and report the data for simulation debugging.

The method provided in this embodiment avoids poor debugging and docking quality caused by poor user debugging and incomplete test conditions by constructing standardized debugging template data.

In addition, considering that the environments built by different partners are quite different, unpredictable situations always occur during the docking process. The docking maintenance personnel in enterprises often need to invest more energy in dealing with these unknown problems and cannot solve these problems quickly. Differences exist in the environment actually built by each developer. For example, situations often exist where the network is not smooth, the bandwidth is insufficient, and the network packet loss rate is too high. During the construction process, unknown problems caused by, for example, version mismatch and incorrect parameter modification, may even occur. To this end, this embodiment provides a user-defined data test. The cloud platform acquires the user-defined test data selected and imported through a console on the development end side as candidate debugging data.

Figure 7:
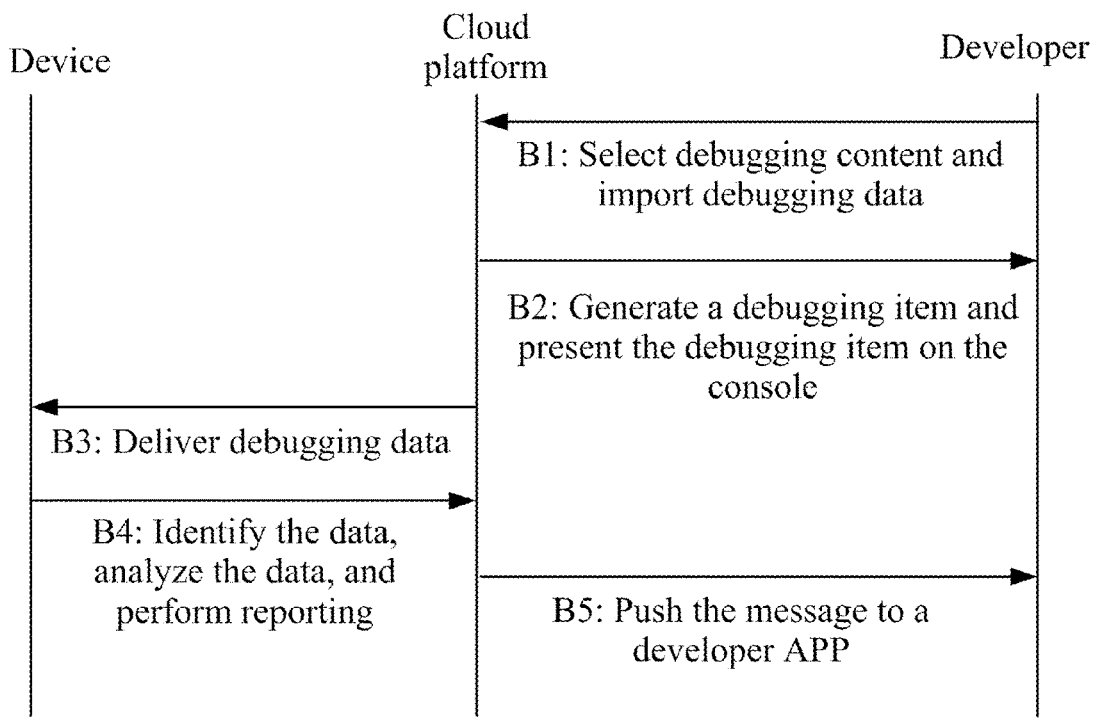
FIG. 7 is a flowchart of a user-defined data test according to an embodiment of the present application.

In another example, for a recognition function of an access control device and a face device, it is often necessary to first deliver a face library to the device. After acquiring an image in a practical scenario, the device compares and analyzes the image through the built-in algorithm and reports the result. After a user delivers the face picture of a specific person A to the device, the image data containing the specific person A collected through other methods may be delivered to the camera through the cloud platform without actually relying on the camera to capture the specific person A to trigger the service. The flow is shown in FIG. 7.

In B1, a developer selects debugging content through a console and imports debugging data.

In B2, after receiving a debugging request, a cloud platform service processing module generates a debugging item and presents the debugging item on the console.

In B3, the cloud platform delivers the debugging data to a device specified in the developer's debugging account.

In B4, after the device acquires the data delivered by the cloud platform, the device's service processing module identifies the data, analyzes the data through built-in algorithm, and reports the identification result to the cloud platform.

In B5, after receiving the identification result reported by the device, the cloud platform pushes the message to a developer APP.

In this method, the developer may implement self-testing of functional items that rely on base library recognition, such as a face recognition function. The delivery of data containing a specific element as the base library is supported. Complete data containing the element and background scenes may be imported for functional testing.

The embodiment of the present application provides a cloud platform docking debugging method. According to debugging application information of a to-be-debugged application, a target Internet of Things device is determined from multiple candidate Internet of Things devices provided externally by the cloud platform, and the target Internet of Things device is allocated to the to-be-debugged application. In response to a debugging request corresponding to the to-be-debugged application, a candidate debugging item of the to-be-debugged application is generated, and the candidate debugging item is displayed on a console on the development end side. According to a target debugging item selected from the candidate debugging item of the to-be-debugged application, debugging data that match the target debugging item are read from candidate debugging data, and the debugging data are delivered to the target Internet of Things device for docking and debugging. Constructing standardized debugging template data avoids poor debugging and docking quality caused by poor user debugging and incomplete test conditions. Customized data import is supported, avoiding the situation where debugging fails in some scenarios and improving the convenience of debugging and users' recognition of products.

Figure 8:
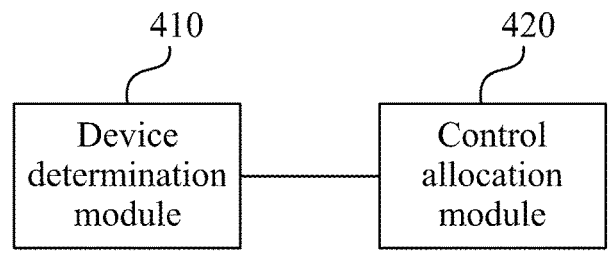
FIG. 8 is a block diagram illustrating the structure of a cloud platform docking debugging apparatus according to an embodiment of the present application.

FIG. 8 is a diagram illustrating the structure of a cloud platform docking debugging apparatus according to an embodiment of the present application. The apparatus includes a device determination module 410 and a control allocation module 420.

The device determination module 410 is configured to determine, according to debugging application information of a to-be-debugged application, a target Internet of Things device from multiple candidate Internet of Things devices provided externally by the cloud platform and allocate the target Internet of Things device to the to-be-debugged application.

The control allocation module 420 is configured to control docking and debugging between the target Internet of Things device allocated to the to-be-debugged application and the to-be-debugged application on a development end side.

The candidate Internet of Things device includes an Internet of Things device that is pre-built and accessed through the cloud platform and provides externally, as a public resource, a debugging service.

For example, the device determination module is configured to perform the operations below.

A temporary debugging account of the to-be-debugged application is generated according to the debugging application information of the to-be-debugged application.

In according to the debugging application information of the to-be-debugged application, the target Internet of Things device is selected from the multiple candidate Internet of Things devices provided externally by the cloud platform.

The target Internet of Things device is shared with the temporary debugging account of the to-be-debugged application, and the temporary debugging account shared with the target Internet of Things device is distributed to the to-be-debugged application on the development end side.

For example, the debugging application information includes service debugging content, a service debugging sequence, a service debugging validity period, and a device model that needs to be purchased for service debugging.

For example, the device determination module is also configured to perform the operations below.

According to the service debugging content included in the debugging application information, the same candidate Internet of Things device that matches the service debugging content is selected from preset device resource pools of at least two categories as the target Internet of Things.

According to the service debugging content and the service debugging sequence included in the debugging application information, different candidate Internet of Things devices are sequentially selected from preset device resource pools of at least two categories to combine as target Internet of Things devices, and it is ensured that a combined target Internet of Things device group matches the service debugging content.

Preset device resource pools of different categories are obtained by the division of multiple candidate Internet of Things device resources according to a service debugging category, operability on a device and impact on the device.

For example, each candidate Internet of Things device has a preset device resource pool to which the each candidate Internet of Things device belongs, and in the preset device resource pools of different categories, some preset device resource pools are configured with the same candidate Internet of Things device.

For example, the preset device resource pools of the at least two categories include an information acquisition type of resource pool, a short-term operation type of resource pool, and a special operation type of resource pool; a candidate Internet of Things device in the information acquisition type of resource pool is allowed to be shared with different debugging accounts at the same time, and a candidate Internet of Things device in the short-term operation type of resource pool or the special operation type of resource pool is only allowed to be shared with one debugging account at the same time.

For example, the control allocation module is configured to perform the operations below.

In response to a debugging request corresponding to the to-be-debugged application, a candidate debugging item of the to-be-debugged application is generated, and the candidate debugging item is displayed on a console on the development end side.

According to a target debugging item selected from the candidate debugging item of the to-be-debugged application, debugging data that match the target debugging item are read from candidate debugging data, and the debugging data are delivered to the target Internet of Things device for docking and debugging.

The candidate debugging data include standard test data of different service types pre-built on the cloud platform and user-defined test data imported to the cloud platform through the console on the development end side.

For example, the control allocation module is also configured to perform the operations below.

The candidate debugging data selected and imported by the console on the development end side are acquired. Alternatively, the candidate debugging data are acquired from standard test databases of different service types pre-built on the cloud platform.

According to the service debugging content carried in the debugging request, candidate debugging data that match the service debugging content are selected to generate the candidate debugging item.

The cloud platform docking debugging apparatus provided in the embodiment of the present application may execute the cloud platform docking debugging method provided in any of the preceding embodiments of the present application and has the corresponding functions to execute the cloud platform docking debugging method. For the detailed process, reference may be made to the relevant operations of the cloud platform docking debugging method in the preceding embodiments.

Figure 9:
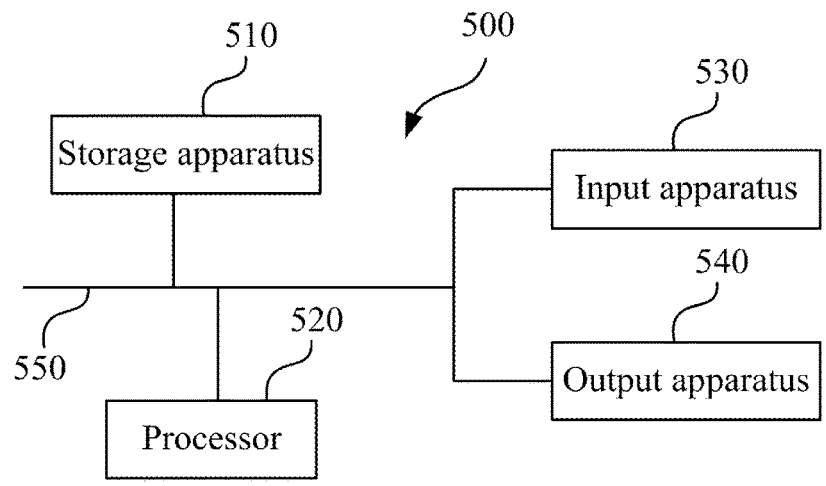
FIG. 9 is a diagram illustrating the structure of an electronic device according to an embodiment of the present application.

FIG. 9 is a diagram illustrating the structure of an electronic device according to an embodiment of the present application. The embodiment of the present application provides an electronic device in which an apparatus for the cloud platform docking debugging method provided by the embodiments of the present application may be integrated. As shown in FIG. 9, this embodiment of the present application provides an electronic device 500. The electronic device 500 includes one or more processors 520 and a storage apparatus 510. The storage apparatus 510 is configured to store one or more programs. When executed by the one or more processors 520, the one or more programs cause the one or more processors 520 to perform the cloud platform docking debugging method according to embodiments of the present application. The method includes the steps below.

According to debugging application information of a to-be-debugged application, a target Internet of Things device is determined from multiple candidate Internet of Things devices provided externally by the cloud platform, and the target Internet of Things device is allocated to the to-be-debugged application.

Docking and debugging between the target Internet of Things device allocated to the to-be-debugged application and the to-be-debugged application on a development end side are controlled.

The candidate Internet of Things device includes an Internet of Things device that is pre-built and accessed through the cloud platform and provides externally, as a public resource, a debugging service.

Of course, those skilled in the art can understand that the processor 520 may also implement the technical solutions of the cloud platform docking debugging method according to any embodiment of the present application.

The electronic device 500 shown in FIG. 9 is merely an example and not intended to limit the function and use scope of embodiments of the present application.

As shown in FIG. 9, the electronic device 500 includes a processor 520, a storage apparatus 510, an input apparatus 530, and an output apparatus 540. One or more processors 520 may be disposed in the electronic device, and one processor 520 is used as an example in FIG. 9. The processor 520, the storage apparatus 510, the input apparatus 530, and the output apparatus 540 in the electronic device may be connected by a bus or in other manners. Connection by a bus 550 is used as an example in FIG. 9.

As a computer-readable storage medium, the storage apparatus 510 may be configured to store software programs, computer-executable programs, and module units, such as program instructions corresponding to the cloud platform docking debugging method in the embodiments of the present application.

The storage apparatus 510 may mainly include a program storage region and a data storage region. The program storage region may store an operating system and an application program required for at least one function. The data storage region may store data or the like created according to the use of the terminal. In addition, the storage apparatus 510 may include a high-speed random-access memory and may also include a nonvolatile memory such as at least one disk memory, flash memory, or other nonvolatile solid-state memories. In some examples, the storage apparatus 510 may include memories that are remotely disposed with respect to the processor 520. These remote memories may be connected via a network. Examples of the preceding network include, but are not limited to, the Internet, an intranet, a local area network, a mobile communication network, and a combination thereof.

The input apparatus 530 may be configured to receive inputted digital, character information, or voice information and generate key signal input related to user settings and function control of the electronic device. The output apparatus 540 may include electronic devices such as a display screen and a speaker.

The electronic device provided by the embodiments of the present application can avoid the dispersion of partner developers and inconvenient debugging and improve the efficiency of problem solving.

Embodiments of the present application provide a computer-readable storage medium. The computer-readable storage medium stores a computer program which, when executed by a processor, performs the cloud platform docking debugging method. The method includes the steps below.

According to debugging application information of a to-be-debugged application, a target Internet of Things device is determined from multiple candidate Internet of Things devices provided externally by the cloud platform, and the target Internet of Things device is allocated to the to-be-debugged application.

Docking and debugging between the target Internet of Things device allocated to the to-be-debugged application and the to-be-debugged application on a development end side are controlled.

The candidate Internet of Things device includes an Internet of Things device that is pre-built and accessed through the cloud platform and provides externally, as a public resource, a debugging service.

A computer storage medium in this embodiment of the present application may adopt any combination of one or more computer-readable media. The computer-readable medium may be a computer-readable signal medium or a computer-readable storage medium. The computer-readable storage medium may be, but is not limited to, an electrical, magnetic, optical, electromagnetic, infrared, or semiconductor system, apparatus, or device, or any combination thereof. Examples (a non-exhaustive list) of the computer-readable storage medium include an electrical connection having one or more wires, a portable computer magnetic disk, a hard disk, a random-access memory (RAM), a read-only memory (ROM), an erasable programmable read-only memory (EPROM), a flash memory, an optical fiber, a portable compact disc read-only memory (CD-ROM), an optical memory device, a magnetic memory device, or any suitable combination thereof. The computer-readable storage medium may be any tangible medium including or storing a program. The program may be used by or used in conjunction with an instruction execution system, apparatus, or device. The computer-readable storage medium may be a non-transient computer-readable storage medium.

The computer-readable signal medium may include a data signal propagated in a baseband or as part of a carrier. The data signal carries computer-readable program codes. The data signal propagated in this manner may be in multiple forms and includes, but is not limited to, an electromagnetic signal, an optical signal, or any suitable combination thereof. The computer-readable signal medium may also be any computer-readable medium other than the computer-readable storage medium. The computer-readable medium may send, propagate, or transmit a program used by or used in conjunction with an instruction execution system, apparatus, or device.

The program codes included on the computer-readable medium may be transmitted on any suitable medium including, but not limited to, a wireless medium, a wire, an optical cable, a radio frequency (RF), or any suitable combination thereof.

Computer program codes for performing the operations of the present application may be written in one or more programming languages or combination thereof, including object-oriented programming languages such as Java, Smalltalk, C++, as well as conventional procedural programming languages such as "C" or similar programming languages. The program codes may be executed entirely on a user computer, partly on a user computer, as a stand-alone software package, partly on a user computer and partly on a remote computer, or entirely on a remote computer or a server. In the case relating to a remote computer, the remote computer may be connected to a user computer via any kind of network including a local area network (LAN) or a wide area network (WAN), or may be connected to an external computer (for example, via the Internet through an Internet service provider).

In the description of the specification, the description of reference terms "an embodiment", "some embodiments", "example", "specific example", or "some examples", and the like means that a specific characteristic, a structure, a material, or a feature described in connection with the embodiments or the examples are included in at least one embodiment or example of the present application. In the specification, the illustrative description of the preceding terms does not necessarily refer to the same embodiment or example. Moreover, the described specific characteristics, structures, materials, or features may be combined properly in one or more embodiments or examples.

What is claimed is:

1. A cloud platform docking debugging method, being applied to a cloud platform and comprising:
   determining, according to debugging application information of a to-be-debugged application, a target Internet of Things device from a plurality of candidate Internet of Things devices provided externally by the cloud platform, and allocating the target Internet of Things device to the to-be-debugged application; and
   controlling docking and debugging between the target Internet of Things device allocated to the to-be-debugged application and the to-be-debugged application on a development end side;
   wherein the plurality of candidate Internet of Things devices comprise an Internet of Things device that is pre-built and accessed through the cloud platform and provides externally, as a public resource, a debugging service;
   wherein determining, according to the debugging application information of the to-be-debugged application, the target Internet of Things device from the plurality of candidate Internet of Things devices provided externally by the cloud platform and allocating the target Internet of Things device to the to-be-debugged application comprise:
   selecting, according to the debugging application information of the to-be-debugged application, the target Internet of Things device from the plurality of candidate Internet of Things devices provided externally by the cloud platform; and
   wherein selecting, according to the debugging application information of the to-be-debugged application, the target Internet of Things device from the plurality of candidate Internet of Things devices provided externally by the cloud platform comprises:
   selecting, according to service debugging content comprised in the debugging application information, a same candidate Internet of Things device that matches the service debugging content from preset device resource pools of at least two categories as the target Internet of Things device; or
   sequentially selecting, according to service debugging content and a service debugging sequence comprised in the debugging application information, different candidate Internet of Things devices from preset device resource pools of at least two categories to combine as target Internet of Things devices, and ensuring that a combined target Internet of Things device group matches the service debugging content;
   wherein preset device resource pools of different categories are obtained by a division of a plurality of candidate Internet of Things device resources according to a service debugging category, operability on a device and impact on the device.

2. The method of claim 1, wherein determining, according to the debugging application information of the to-be-debugged application, the target Internet of Things device from the plurality of candidate Internet of Things devices provided externally by the cloud platform and allocating the target Internet of Things device to the to-be-debugged application further comprise:
   generating a temporary debugging account of the to-be-debugged application according to the debugging application information of the to-be-debugged application;
   sharing the target Internet of Things device with the temporary debugging account of the to-be-debugged application, and distributing the temporary debugging account shared with the target Internet of Things device to the to-be-debugged application on the development end side.

3. The method of claim 1, wherein each candidate Internet of Things device of the plurality of candidate Internet of Things devices has a preset device resource pool to which the each candidate Internet of Things device belongs, and in the preset device resource pools of different categories, some preset device resource pools are configured with a same candidate Internet of Things device.

4. The method of claim 1, wherein the preset device resource pools of the at least two categories comprise an information acquisition type of resource pool, a short-term operation type of resource pool, and a special operation type of resource pool, wherein a candidate Internet of Things device in the information acquisition type of resource pool is allowed to be shared with different debugging accounts at the same time, and a candidate Internet of Things device in the short-term operation type of resource pool or the special operation type of resource pool is only allowed to be shared with one debugging account at the same time.

5. The method of claim 1, wherein controlling the docking and the debugging between the target Internet of Things device allocated to the to-be-debugged application and the to-be-debugged application on the development end side comprises:
   in response to a debugging request corresponding to the to-be-debugged application, generating a candidate debugging item of the to-be-debugged application, and displaying the candidate debugging item on a console on the development end side; and reading, according to a target debugging item selected from the candidate debugging item of the to-be-debugged application, debugging data that match the target debugging item from candidate debugging data, and delivering the debugging data to the target Internet of Things device for the docking and the debugging;

wherein the candidate debugging data comprise standard test data of different service types pre-built on the cloud platform and user-defined test data imported to the cloud platform through the console on the development end side.

6. The method of claim 5, wherein generating the candidate debugging item of the to-be-debugged application comprises:

acquiring the candidate debugging data selected and imported by the console on the development end side; or acquiring the candidate debugging data from standard test databases of different service types pre-built on the cloud platform; and selecting, according to service debugging content carried in the debugging request, candidate debugging data that match the service debugging content to generate the candidate debugging item.

7. An electronic device, comprising:

at least one processor; and a storage apparatus configured to store at least one program;

wherein the at least one program, when executed by the at least one processor, causes the at least one processor to perform:

determining, according to debugging application information of a to-be-debugged application, a target Internet of Things device from a plurality of candidate Internet of Things devices provided externally by the cloud platform, and allocating the target Internet of Things device to the to-be-debugged application; and controlling docking and debugging between the target Internet of Things device allocated to the to-be-debugged application and the to-be-debugged application on a development end side;

wherein the plurality of candidate Internet of Things devices comprise an Internet of Things device that is pre-built and accessed through the cloud platform and provides externally, as a public resource, a debugging service;

wherein the at least one processor is caused to determine, according to the debugging application information of the to-be-debugged application, the target Internet of Things device from the plurality of candidate Internet of Things devices provided externally by the cloud platform and allocate the target Internet of Things device to the to-be-debugged application in the following manners:

selecting, according to the debugging application information of the to-be-debugged application, the target Internet of Things device from the plurality of candidate Internet of Things devices provided externally by the cloud platform; and wherein the at least one processor is caused to select, according to the debugging application information of the to-be-debugged application, the target Internet of Things device from the plurality of candidate Internet of Things devices provided externally by the cloud platform in the following manners:

selecting, according to service debugging content comprised in the debugging application information, a same candidate Internet of Things device that matches the service debugging content from preset device resource pools of at least two categories as the target Internet of Things device; or sequentially selecting, according to service debugging content and a service debugging sequence comprised in the debugging application information, different candidate Internet of Things devices from preset device resource pools of at least two categories to combine as target Internet of Things devices, and ensuring that a combined target Internet of Things device group matches the service debugging content;

wherein preset device resource pools of different categories are obtained by a division of a plurality of candidate Internet of Things device resources according to a service debugging category, operability on a device and impact on the device.

8. The device of claim 7, wherein the at least one processor is caused to determine, according to the debugging application information of the to-be-debugged application, the target Internet of Things device from the plurality of candidate Internet of Things devices provided externally by the cloud platform and allocate the target Internet of Things device to the to-be-debugged application perform:

generating a temporary debugging account of the to-be-debugged application according to the debugging application information of the to-be-debugged application;

and sharing the target Internet of Things device with the temporary debugging account of the to-be-debugged application, and distributing the temporary debugging account shared with the target Internet of Things device to the to-be-debugged application on the development end side.

9. The device of claim 7, wherein each candidate Internet of Things device of the plurality of candidate Internet of Things devices has a preset device resource pool to which the each candidate Internet of Things device belongs, and in the preset device resource pools of different categories, some preset device resource pools are configured with a same candidate Internet of Things device.

10. The device of claim 7, wherein the preset device resource pools of the at least two categories comprise an information acquisition type of resource pool, a short-term operation type of resource pool, and a special operation type of resource pool, wherein a candidate Internet of Things device in the information acquisition type of resource pool is allowed to be shared with different debugging accounts at the same time, and a candidate Internet of Things device in the short-term operation type of resource pool or the special operation type of resource pool is only allowed to be shared with one debugging account at the same time.

11. The device of claim 7, wherein the at least one processor is caused to control the docking and the debugging between the target Internet of Things device allocated to the to-be-debugged application and the to-be-debugged application on the development end side in the following manners:

in response to a debugging request corresponding to the to-be-debugged application, generating a candidate debugging item of the to-be-debugged application, and displaying the candidate debugging item on a console on the development end side; and reading, according to a target debugging item selected from the candidate debugging item of the to-be-debugged application, debugging data that match the target debugging item from candidate debugging data, and delivering the debugging data to the target Internet of Things device for the docking and the debugging;

wherein the candidate debugging data comprise standard test data of different service types pre-built on the cloud platform and user-defined test data imported to the cloud platform through the console on the development end side.

12. The device of claim 11, wherein the at least one processor is caused to generate the candidate debugging item of the to-be-debugged application in the following manners:

acquiring the candidate debugging data selected and imported by the console on the development end side; or acquiring the candidate debugging data from standard test databases of different service types pre-built on the cloud platform; and selecting, according to service debugging content carried in the debugging request, candidate debugging data that match the service debugging content to generate the candidate debugging item.

13. A non-transitory computer-readable storage medium storing a computer program which, when executed by a processor, causes the processor to perform:

determining, according to debugging application information of a to-be-debugged application, a target Internet of Things device from a plurality of candidate Internet of Things devices provided externally by the cloud platform, and allocating the target Internet of Things device to the to-be-debugged application; and controlling docking and debugging between the target Internet of Things device allocated to the to-be-debugged application and the to-be-debugged application on a development end side;

wherein the plurality of candidate Internet of Things devices comprise an Internet of Things device that is pre-built and accessed through the cloud platform and provides externally, as a public resource, a debugging service;

wherein determining, according to the debugging application information of the to-be-debugged application, the target Internet of Things device from the plurality of candidate Internet of Things devices provided externally by the cloud platform and allocating the target Internet of Things device to the to-be-debugged application comprise:

selecting, according to the debugging application information of the to-be-debugged application, the target Internet of Things device from the plurality of candidate Internet of Things devices provided externally by the cloud platform; and wherein selecting, according to the debugging application information of the to-be-debugged application, the target Internet of Things device from the plurality of candidate Internet of Things devices provided externally by the cloud platform comprises:

selecting, according to service debugging content comprised in the debugging application information, a same candidate Internet of Things device that matches the service debugging content from preset device resource pools of at least two categories as the target Internet of Things device; or sequentially selecting, according to service debugging content and a service debugging sequence comprised in the debugging application information, different candidate Internet of Things devices from preset device resource pools of at least two categories to combine as target Internet of Things devices, and ensuring that a combined target Internet of Things device group matches the service debugging content;

wherein preset device resource pools of different categories are obtained by a division of a plurality of candidate Internet of Things device resources according to a service debugging category, operability on a device and impact on the device.

14. The storage medium of claim 13, wherein the processor is caused to determine, according to the debugging application information of the to-be-debugged application, the target Internet of Things device from the plurality of candidate Internet of Things devices provided externally by the cloud platform and allocating the target Internet of Things device to the to-be-debugged application in the following manners:

generating a temporary debugging account of the to-be-debugged application according to the debugging application information of the to-be-debugged application;

sharing the target Internet of Things device with the temporary debugging account of the to-be-debugged application, and distributing the temporary debugging account shared with the target Internet of Things device to the to-be-debugged application on the development end side.

15. The storage medium of claim 13, wherein each candidate Internet of Things device of the plurality of candidate Internet of Things devices has a preset device resource pool to which the each candidate Internet of Things device belongs, and in the preset device resource pools of different categories, some preset device resource pools are configured with a same candidate Internet of Things device.

16. The storage medium of claim 13, wherein the preset device resource pools of the at least two categories comprise an information acquisition type of resource pool, a short-term operation type of resource pool, and a special operation type of resource pool, wherein a candidate Internet of Things device in the information acquisition type of resource pool is allowed to be shared with different debugging accounts at the same time, and a candidate Internet of Things device in the short-term operation type of resource pool or the special operation type of resource pool is only allowed to be shared with one debugging account at the same time.

17. The storage medium of claim 13, wherein the processor is caused to control the docking and the debugging between the target Internet of Things device allocated to the to-be-debugged application and the to-be-debugged application on the development end side in the following manners:

in response to a debugging request corresponding to the to-be-debugged application, generating a candidate debugging item of the to-be-debugged application, and displaying the candidate debugging item on a console on the development end side; and reading, according to a target debugging item selected from the candidate debugging item of the to-be-debugged application, debugging data that match the target debugging item from candidate debugging data, and delivering the debugging data to the target Internet of Things device for the docking and the debugging;

wherein the candidate debugging data comprise standard test data of different service types pre-built on the cloud platform and user-defined test data imported to the cloud platform through the console on the development end side.

18. The storage medium of claim 17, wherein the processor is caused to generate the candidate debugging item of the to-be-debugged application in the following manners:
acquiring the candidate debugging data selected and imported by the console on the development end side; or acquiring the candidate debugging data from standard test databases of different service types pre-built on the cloud platform; and
selecting, according to service debugging content carried in the debugging request, candidate debugging data that match the service debugging content to generate the candidate debugging item.

* * * * *